(12) United States Patent
Tian

(10) Patent No.: US 8,164,676 B2
(45) Date of Patent: Apr. 24, 2012

(54) CAMERA MODULE PROVIDING RELIABLE LONG TERM ADHERENCE

(75) Inventor: Jia-Jun Tian, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 497 days.

(21) Appl. No.: 12/406,944

(22) Filed: Mar. 18, 2009

(65) Prior Publication Data

US 2010/0165183 A1 Jul. 1, 2010

(30) Foreign Application Priority Data

Dec. 26, 2008 (CN) .......................... 2008 1 0306548

(51) Int. Cl.
*H04N 5/225* (2006.01)
(52) U.S. Cl. ........................................ 348/340; 348/374
(58) Field of Classification Search .................. None
See application file for complete search history.

(56) References Cited

U.S. PATENT DOCUMENTS

| | | | |
|---|---|---|---|
| 6,768,516 B2* | 7/2004 | Yamada et al. | 348/340 |
| 7,009,654 B2* | 3/2006 | Kuno et al. | 348/374 |
| 7,242,433 B2* | 7/2007 | Tanaka et al. | 348/340 |
| 7,564,111 B2* | 7/2009 | Sawahata et al. | 257/432 |
| 2008/0023808 A1* | 1/2008 | Wu et al. | 257/678 |
| 2008/0023809 A1* | 1/2008 | Wu et al. | 257/678 |

FOREIGN PATENT DOCUMENTS

| | | | |
|---|---|---|---|
| CN | 2718785 Y | | 8/2005 |
| CN | 2718785 Y | * | 8/2005 |
| EP | 1351316 A2 | | 10/2003 |

\* cited by examiner

*Primary Examiner* — Justin P Misleh
(74) *Attorney, Agent, or Firm* — Altis Law Group, Inc.

(57) ABSTRACT

An camera module includes a substrate, an image sensor chip, and a lens module. The image sensor chip is disposed on and electrically connected to the substrate. The lens module is mounted on the base via an adhesive layer. The lens module includes a bottom surface contacting with the substrate. The bottom surface defines at least one sloped surfaces thereon. At least one gap is defined between the substrate and the at least one sloped surface. The adhesive layer is disposed between the bottom surface and the substrate, the gap is capable of accepting adhesive when the lens module and substrate are pressed together.

8 Claims, 3 Drawing Sheets

CAMERA MODULE PROVIDING RELIABLE LONG TERM ADHERENCE

BACKGROUND

1. Technical Field

The disclosure relates to a camera module.

2. Description of the Related Art

Current camera modules typically include an image sensor chip, a substrate, a number of gold wires, an encapsulation glass, and a lens module. The image sensor chip is disposed on the substrate and electrically connected to the substrate via the gold wires. The encapsulation glass encapsulates the image sensor chip and the gold wires. The lens module is installed on the substrate via adhesive layer, enclosing the image sensor chip, the gold wires, and the encapsulation glass. The problem is, during installing the lens module to the substrate, the adhesive layer is pressed and it spreads to the immediate area of the lens module on the substrate, contaminating the substrate. In addition, the adhered area of the lens module is limited to the bottom surface thereof, which is typically not adequate to provide reliable long term adherence.

What is desired is a camera module that can overcome the above-described problems.

BRIEF DESCRIPTION OF THE DRAWINGS

Many aspects of the present camera module is better understood with reference to the accompanying drawings. The components in the drawings are not necessarily drawn to scale, the emphasis instead being placed upon clearly illustrating the principles of the camera module. Moreover, in the drawings, like reference numerals designate corresponding parts throughout the several views.

DETAILED DESCRIPTION

Embodiments of the present camera module will now be described in detail with references to the drawings.

Figure 1:
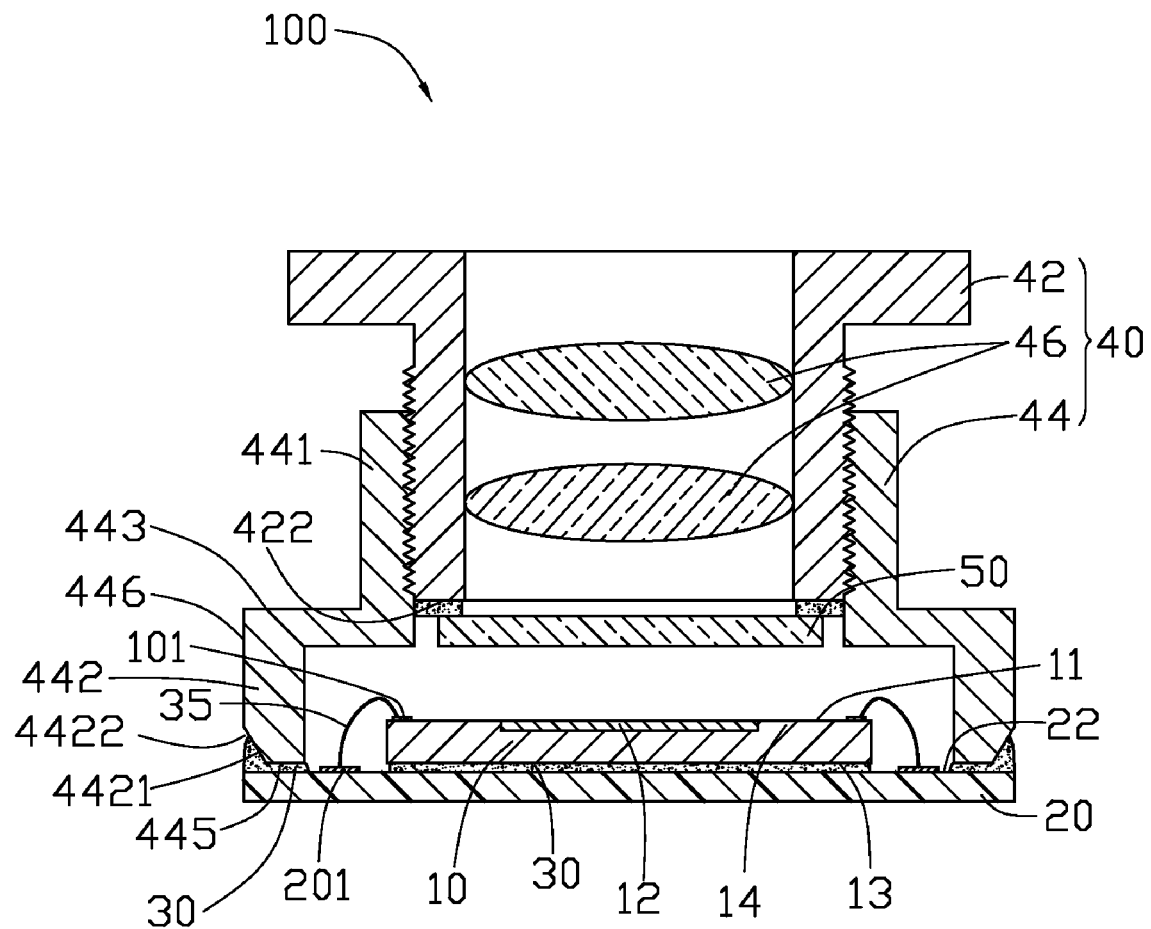
FIG. 1 is a schematic, cross-sectional view of a camera module, according to a first exemplary embodiment.

Referring to FIG. 1, a camera module 100, according to a first exemplary embodiment, includes an image sensor chip 10, a substrate 20, an adhesive layer 30, a number of conductive wires 35, a lens module 40, and a transparent cover 50.

The image sensor chip 10 can be a charged coupled device (CCD) or a complementary metal-oxide-semiconductor (CMOS). The image sensor chip 10 includes a top surface 11 and a bottom surface 13 facing away from the top surface 11. The image sensor chip 10 has a photosensitive area 12 formed on the center of the top surface 11, and a non-photosensitive area 14 surrounding the photosensitive area 12. The non-photosensitive area 14 has a number of chip pads 101 formed thereon.

The substrate 20 can be made of a material such as: polyimide, ceramic, or glass fiber. The substrate 20 has a supporting surface 22. The bottom surface 13 of the image sensor chip 10 is adhered to the supporting surface 22 via the adhesive layer 30. The adhesive layer 30 can be made, for example, from silicone, epoxy, acrylic, or polyamide.

A number of base pads 201 are disposed on the supporting surface 22 of the substrate 20. Each base pad 201 can be electrically connected to a corresponding chip pad 101 via a conductive wire 35. The conductive wires 35 can be made of a conductive material, such as gold, silver, aluminum, or an alloy thereof.

Alternatively, the image sensor chip 10 may be mechanically and electrically connected to the substrate 20 by available package processes, such as, chip-scale, wafer-level chip-scale, ceramic leaded, plastic leadless chip, thermal compression bonding, and flip chip packaging processes.

The lens module 40 is aligned with the image sensor chip 10. The lens module 40 includes a lens barrel 42, a lens holder 44, and lens group 46. The lens holder 44 comprises a top hollow cylinder 441, a bottom hollow cylinder 442 coaxially aligned with and communicated with the top hollow cylinder 441, and a connecting plate 443 connecting the top hollow cylinder 441 and the bottom hollow cylinder 442. The lens group 46 is received in the lens barrel 42. The combined lens barrel 42 and lens group 46 are received in the top hollow cylinder 441. The image sensor chip 10 is received in the bottom hollow cylinder 442. The bottom hollow cylinder 442 comprises a bottom surface 445 contacting with the substrate 20, and an outer sidewall 446. The bottom surface 445 defines a sloped surface 4421 extending from the bottom surface 445 to the outer sidewall 446. The bottom surface 445 and the sloped surface 4421 define an angle therebetween. The angle, in this embodiment, is greater than 30 degrees. A gap 4422 is defined between the substrate 20 and the sloped surface 4421 of the bottom hollow cylinder 442 of the lens holder 44.

The gap 4422 is filled with the adhesive layer 30. The lens module 40 is disposed on the supporting surface 22 of the substrate 20 via the adhesive layer 30.

The lens barrel 42 comprises a lower surface 422 facing the image sensor chip 10. The transparent cover 50, such as an infrared filter, is provided between the image sensor chip 10 and the lens group 46 and is configured for protecting the photosensitive area 12 from contamination and filtering light from the lens group 46. The transparent cover 50 is secured to the lower surface 422 of the lens barrel 42 by the adhesive layer 30. Alternatively, the transparent cover 50 may be directly fixed to the lens module 40. Alternatively, the transparent cover 50 can be fixed to the inner surface of the connecting plate 443. The transparent cover 50 may be an optical glass plate.

In assembly, the adhesive 30 is disposed on the supporting surface 22 of the substrate 20, when the lens module 40 is assembled on the substrate 20, the adhesive layer 30 flows into the gap 4422 of the lens holder 44 and contacts with the sloped surface 4421, which prevents the adhesive layer 30 from overflowing on to the substrate 30. In addition, the contact area between the adhesive layer 30 and the bottom surface 445 of the lens holder 44 may have complimentary patterns formed therein to increase contact area, thereby, bonding strength between the lens module 40 and the substrate 20 is stronger.

Figure 2:
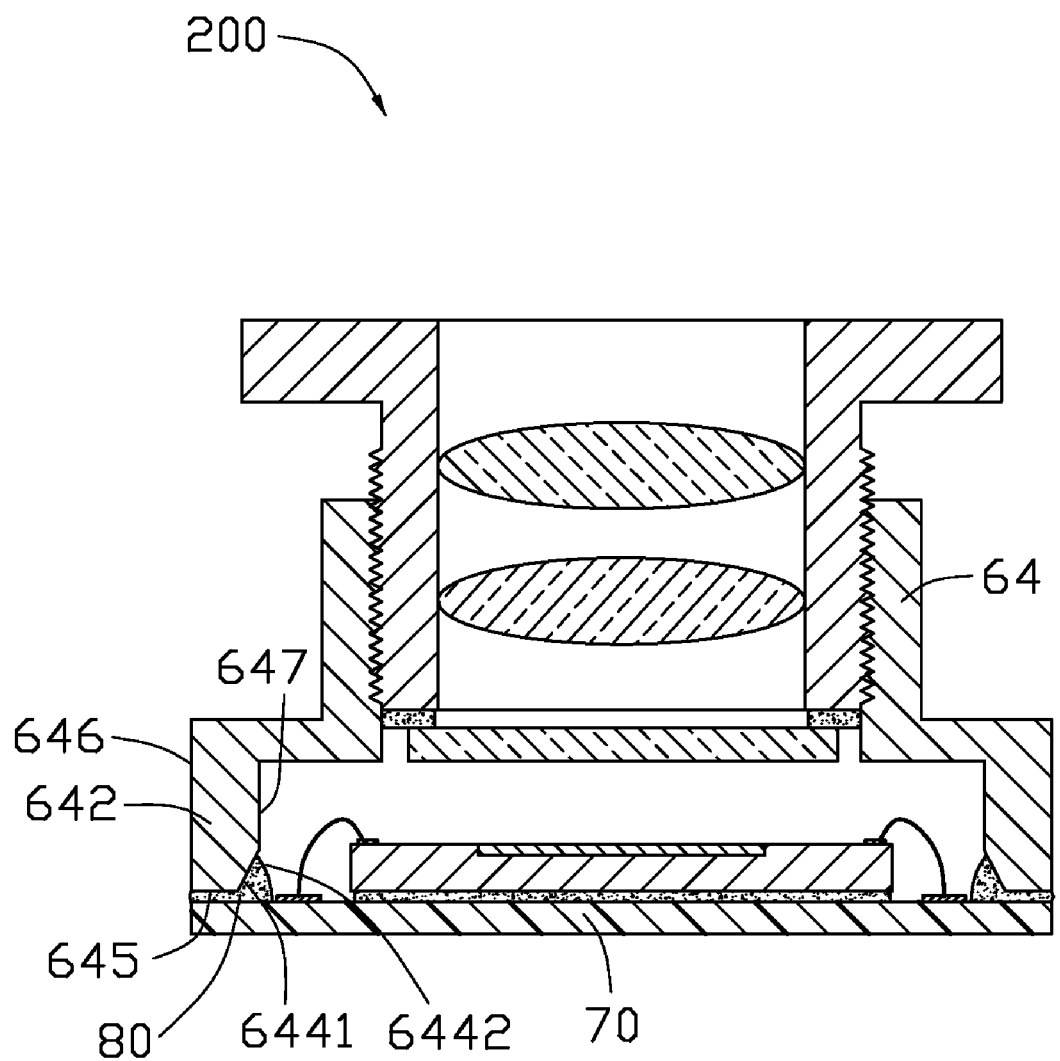
FIG. 2 is a schematic, cross-sectional view of a camera module, according to a second exemplary embodiment.

Referring to FIG. 2, a camera module 200 in accordance with a second exemplary embodiment is disclosed, differing from the camera module 100 only in the lens holder 64. In this embodiment, the bottom hollow cylinder 642 comprises an inner sidewall 647 facing away the outer sidewall 646. The bottom surface 645 defines an sloped surface 6441 extending from the bottom surface 645 to the inner sidewall 647. The bottom surface 645 and the sloped surface 6441 defines an angle therebetween, which in this embodiment, is greater than 30 degree. A gap 6442 is defined between the substrate 70 and the sloped surface 6441 of the bottom hollow cylinder 642 of the lens holder 64. In this embodiment, the gap 6442 is triangular in shape.

Figure 3:
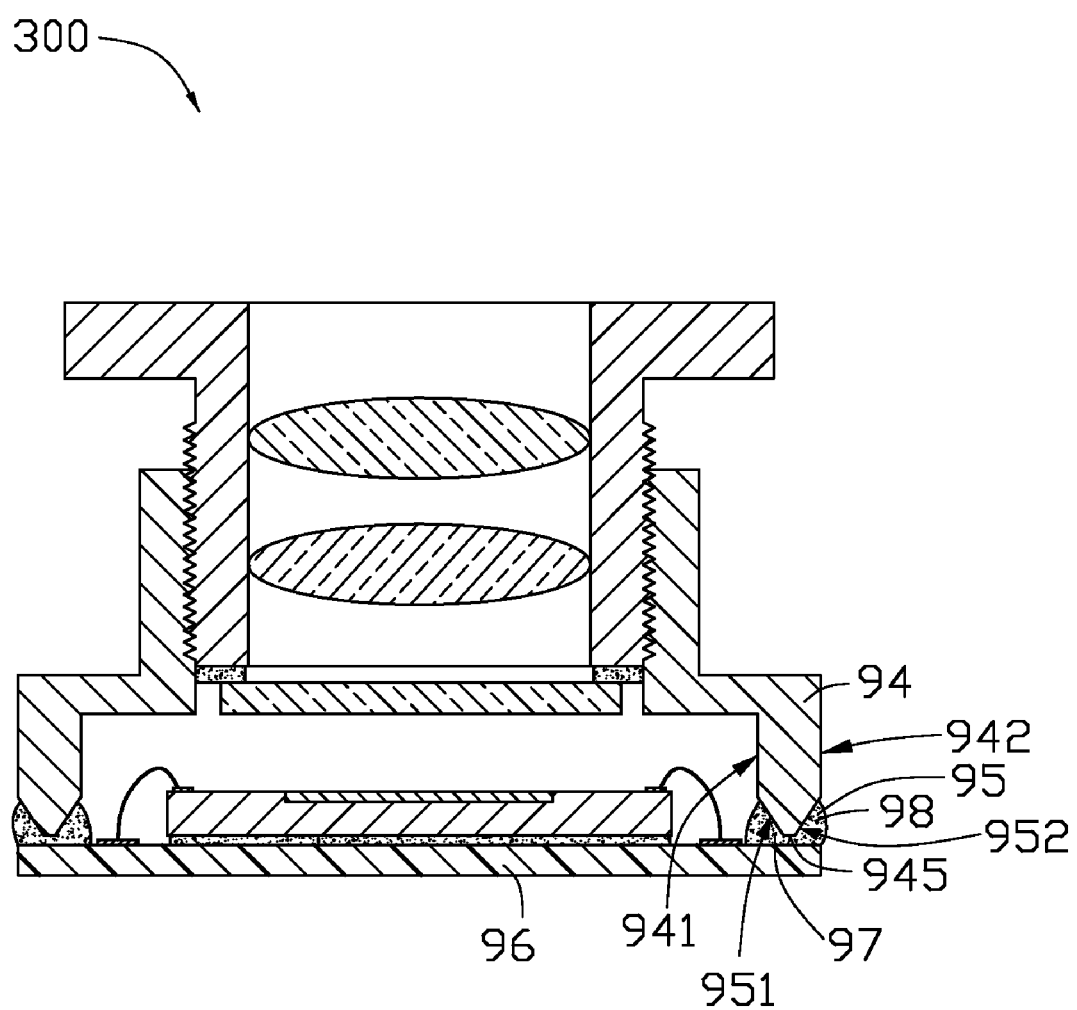
FIG. 3 is a schematic, cross-sectional view of a camera module, according to a third exemplary embodiment.

Referring to FIG. 3, a camera module 300 in accordance with a third exemplary embodiment is disclosed. In this embodiment, the profile of the bottom surface 945 of the lens holder 94 is "V" shaped but is not limited in that configuration. The bottom surface 945 is square shaped, and defines an inner sloped surface 951 extending from the bottom surface 945 to the inner sidewall 941, and an outer sloped surfaces 952 extending from the bottom surface 945 to the outer sidewall 942. A first gap 97 is defined between the substrate 96 and the inner sloped surface 951. A second gap 98 is defined between the substrate 96 and the outer sloped surface 952. It should note that, the bottom surface 945 of the lens holder 94 can also define a trapeziform gap for accommodating the adhesive layer 95. Because the profile of the bottom surface 945 is "V" shaped, when the adhesive layer 95 disposes between the bottom surface 945 and the substrate 96, which not only prevents the adhesive layer 95 from overflowing on to the substrate 96, but also increases the amount of surface contact between the substrate 96 and the bottom surface 945 via the adhesive 95.

It will be understood that the above particular embodiments and methods are shown and described by way of illustration only. The principles and the features of the disclosure may be employed in various and numerous embodiment thereof without departing from the scope of the invention as claimed. The above-described embodiments illustrate the scope of the invention but do not restrict the scope of the invention.

What is claimed is:

1. A camera module comprising:
   a substrate;
   an image sensor chip disposed on and electrically connected to the substrate;
   a transparent cover, the transparent cover being an infrared filter;
   a lens module mounted on the substrate via an adhesive layer, the lens module comprising:
      a bottom surface contacting with the substrate, the bottom surface defining at least one sloped surface, wherein at least one gap is defined between the substrate and the at least one sloped surface, the adhesive layer being disposed between the bottom surface and the substrate; the gap is capable of accepting adhesive when the lens module and the substrate are pressed together, the lens module also comprises a lens holder, a lens barrel, and a lens group, the lens holder comprises a top hollow cylinder and a bottom hollow cylinder, the bottom surface is located on the bottom hollow cylinder and the image sensor chip is received in the bottom hollow cylinder, the lens barrel and the lens group are received in the lens barrel, the combined lens barrel and lens group are received in the top hollow cylinder, the lens barrel comprises a lower surface facing the image sensor chip, the transparent cover is secured to the lower surface of the lens barrel by another adhesive layer.

2. The camera module as claimed in claim 1, wherein the lens module further comprises a outer sidewall, the at least one sloped surface extending from the bottom surface to the outer sidewall.

3. The camera module as claimed in claim 1, wherein the lens module further comprises a inner sidewall, the sloped surface extending from the bottom surface to the inner sidewall.

4. The camera module as claimed in claim 1, wherein the gap is triangular, or a trapeziform in shape.

5. The camera module as claimed in claim 1, wherein the profile of the bottom surface is "V" in shape.

6. The camera module as claimed in claim 1, wherein the lens module further comprises an inner sidewall and an outer sidewall, the bottom surface defines an inner sloped surface extending from the bottom surface to the inner sidewall, and an outer sloped surfaces extending from the bottom surface to the outer sidewall, a first gap is defined between the substrate and the inner sloped surface, a second gap is defined between the substrate and the outer sloped surface.

7. The camera module as claimed in claim 1, wherein the image sensor chip comprises a photosensitive area on the substrate, and a non-photosensitive area surrounding the photosensitive area, the non-photosensitive area comprises a number of chip pads, the substrate comprises a plurality of base pads, each base pad is electrically connected to a corresponding chip pad via a conductive wire.

8. The camera module as claimed in claim 1, wherein the image sensor chip is mechanically and electrically connected to the substrate by chip-scale, wafer-level chip-scale, ceramic leaded, plastic leadless chip, thermal compression bonding, or a flip chip packaging processes.

* * * * *